Jan. 5, 1971        E. HENNIG        3,553,007
METHOD OF TREATING BRAKE DISKS
Filed Dec. 27, 1967
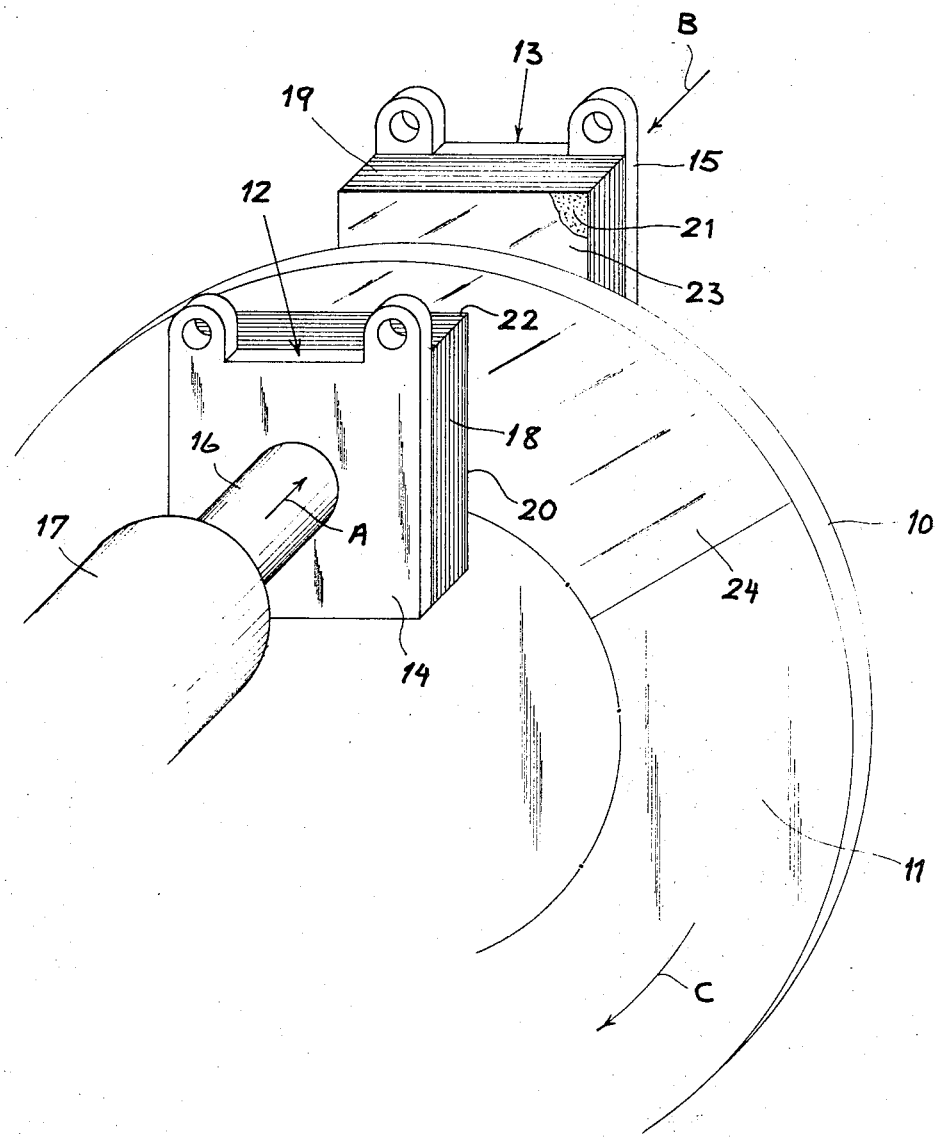
Erich Hennig
INVENTOR
BY Karl F. Ross
ATTORNEY

United States Patent Office 3,553,007
Patented Jan. 5, 1971

3,553,007
METHOD OF TREATING BRAKE DISKS
Erich Hennig, Konigstein, Germany, assignor to Alfred Teves G.m.b.H., Frankfurt am Main, Germany, a corporation of Germany
Filed Dec. 27, 1967, Ser. No. 693,908
Claims priority, application Germany, Jan. 7, 1967, T 32,929
Int. Cl. B44d 1/02
U.S. Cl. 117—120                               7 Claims

ABSTRACT OF THE DISCLOSURE

A method of treating a brake disk to render its braking faces corrosion-resistant wherein a nonmetallic corrosion-resistant coating substance is applied to the braking surface of a brakeshoe and the brakeshoe is held against the rotating brake disk to transfer the coating from the brakeshoe to the disk and causing the coating to bond to the disk, the coating having approximately the same coefficient of friction as the brake and being thermally activatable so as to transfer only upon the development of frictional heat; the coating material also has a greater adhesion to the disk surface than to the brake lining material.

---

My present invention relates to a method of treating brake disks of disk-brake assemblies to limit corrosion of the annular braking faces of the disk.

A disk-brake system for automotive vehicles and the like generally comprises a rotatable brake disk which is coupled with the tire-carrying wheel-disk of the vehicle or an axle connected therewith, the disk having a pair of annular braking faces lying in planes usually perpendicular to its axis of rotation and respectively juxtaposed, over a limited portion of the circumference of the disk, with the braking surfaces of respective brakeshoes. The latter are mounted on a yoke carried by the axle housing or another part of the vehicle body and are applied axially to the disk by one or more wheel-brake cylinders formed in the brake housing or yoke. The brakeshoes usually have a lining carrier in the form of a backing plate to which a brake lining is bonded. It is a recognized problem in the field that the braking faces of the disk, which may come into contact with moisture, up by the wheels, etc. are senstive to corrosion, especially during vehicle storage, which varies the characteristics of the frictional engagement of the brakeshoe with the disk. Such corrosion occurs rapidly on the polished faces of the disk and thus renders it highly susceptible to oxidation processes.

To avoid the effects of such corrosion, it has been proposed to provide the brake disks of automotive vehicle disk brakes with coatings of corrosion-resistant materials or to treat the cast-iron or steel disks so as to reduce the corrodobility thereof. Such processes are difficult to carry out with large bodies such as the brake disk and/or are relatively expensive. Typical treatments which have been proposed heretofore are chromium-plating, nitriding, metal sputtering, metal spraying or the like. Furthermore, the process must be carried out before the disk is assembled on the vehicle. In other systems, corrosion is delayed by alloying the metal from which the disk is cast or otherwise formed with substances imparting a corrosion-resistant crystal-line structure. In practice, even this technique has not been found to be satisfactory.

It is, therefore, the principal object of the present invention to provide an improved method increasing the corrosion-resistance of the annular braking faces of the disk of an automotive vehicle disk brake.

Another object of this invention is to provide a low-cost process capable of reducing the corrosion of a brake disk.

Yet another object of the instant invention is the provision of a method of limiting the corrosion of a brake disk when the disk is in place in a vehicle-brake system.

I have found that the corrosion of a brake disk can be materially reduced by coating the disk in situ, i.e. with the disk in place in a disk-brake assembly of an automotive vehicle, with a corrosion-resistant coating substance which is applied to the braking surface of a brake lining and is transferred under gentle pressure to the braking face of the disk by urging the brakeshoe against the braking face of the disk via the usual brake-actuating means while the disk is rotated past this brakeshoe. Surprisingly, the coating material is applied to the disk and bonded to the latter so as to form a long-lasting corrosion protection.

According to a more specific feature of this invention, the nonmetallic coating material has a preferential adhesion to the metal face of the disk with reference to its bond to the brake lining and is thermally activatable (i.e. thermoplastic) at the temperature generated by application of the brakeshoe to a rotating disk. Thus, the heating of the coating material is created in situ by friction heat and suffices to release the bond to the lining and promote bonding to the disk at the initial application of the brake during use of the automotive vehicle or in the testing runs prior to the delivery of the vehicle (e.g. during trial in advance of sale) or at the time the vehicle is loaded for transport to market. The corrosion-resistant coating lasts at least for the period until the vehicle is placed in regular use, at which time the normal operation of the brake limits the development of corrosion deposits. Furthermore, prior to storage of the vehicle, the brakeshoes may be coated with the corrosion-resistant substance to apply yet another layer to the disk in the manner indicated.

According to still another feature of this invention, the nonmetallic corrosion-resistant coating should have approximately the same coefficien of sliding friction as the brake lining. The substance may be applied in the form of a lacquer (with volatile-solvent medium) or foil to the braking surface of the lining and is eliminated by transfer to the disk in the manner indicated. The requisite slight coating or film is formed by a light brief depression of the brake pedal.

The above and other objects, features and advantages of the present invention will become more readily apparent from the following description, reference being made to the accompanying drawing, the sole figure of which is a diagrammatic perspective view illustrating the present invention.

In the drawing, I diagrammatically show a wheel brake of an automotive vehicle which has a rotatable brake disk 10 whose annular braking faces are represented by the dot-dash line zone 11 and which is flanked by a pair of brakeshoes 12 and 13. The brakeshoes 12 and 13, mounted in a yoke or housing of conventional construction (not shown) comprise the backing plates 14 and 15 to which axial pressure is applied in the direction of arrows A and B by the wheel-brake piston represented at 16. The latter is shiftable in a wheel-brake cylinder 17 actuated by the master cylinder of the hydraulic-brake network of this vehicle.

The backing plates 14 and 15 carry brake linings 18 and 19 of phenol-formaldehyde bonded asbestos fibers or any other conventional brake-lining material. Atop this lining and along the braking face 20 and 21 thereof, I provide, respectively, a solvent-deposited lacquer layer 22 or a foil 23 of the nonmetallic corrosion-resistant material which is applied as a light coating or film 24 while the disk 10 is rotated (arrow C) relative to the brake housing and the brake shoes are applied lightly against the disk. Preferably, the coating material is a thermally activatable (softenable) substance such as polyethylene which preferentially adheres to the metal disk over the phenolic lining.

The coefficient of friction of the coating approximates that of the lining therebelow. The foil 23 may be bonded to the lining matreial by heat. It has been found that the axial pressure of the brakeshoe against the disk and the frictional heat developed yields a coating which strongly adheres to the metal of the disk and effectively prevents any corrosion of the braking faces thereof even during storage in humid conditions for periods ranging from several days to several months and deteriorates only when the vehicle is placed into constant use at which time corrosion is limited by the usual brake operation.

The invention described and illustrated is believed to admit of many modifications within the ability of persons skilled in the art, all such modifications being considered within the spirit and scope of the appended claims.

I claim:

1. A method of rendering the annular braking faces of the brake disk of a disk brake corrosion-resistant, the disk brake having a pair of opposing brakeshoes juxtaposed with the annular braking faces of said disk, comprising coating the brakeshoes along the surfaces thereof confronting the disk with a nonmetallic, thermally softenable corrosion-resistant, synthetic-resin material adapted to bond to the brake disk with a greater adhesive force than to the brakeshoes, simultaneously urging said brakeshoes toward one another and against said faces to develop frictional heat between the brakeshoes and the disk, thereby softening said material; and maintaining the pressure of said brakeshoes against said disk to apply said material to said disk in a corrosion-resistant layer.

2. The method defined in claim 1 wherein said corrosion-resistant material is polyethylene and the brakeshoes upon which it is applied are composed of phenol-formaldehyde bonded asbestos fiber.

3. A method of increasing the corrosion resistance of the rotating brake member of a brake for automotive vehicles, the brake having at least one brakeshoe juxaposed with an annular braking face of the member and means for urging the brakeshoe into frictional contact with the member upon rotation of the member past said brakeshoe, said method comprising the steps of coating a braking surface of said brakeshoe engageable with said braking face with a layer of a corrosion-resistant substance transferable to said face; and applying said brakeshoe against said member to bring said coating into contact therewith while rotating said member past said brakeshoe, thereby transferring said substance to said braking face.

4. The method defined in claim 3 wherein said coating is applied to said brakeshoe as a lacquer.

5. The method defined in claim 3 wherein said coating is applied to said brakeshoe in the form of a foil.

6. The method defined in claim 3 wherein said brakeshoe has a lining forming said braking surface and said substance is a corrosion-resistant material having a frictional coefficient approximately equal to that of said lining.

7. The method defined in claim 6 wherein said material is thermally softenable to bond to said member, said brakeshoe with the coating thereon being applied against said member with a pressure and said member being rotated at a speed sufficient to generate frictional heat capable of thermally softening said material to bond same to said member.

References Cited
UNITED STATES PATENTS

| | | | |
|---|---|---|---|
| 2,688,563 | 9/1954 | Kieffer | 117—132(C)X |
| 3,025,184 | 3/1962 | Blair et al. | 118—76X |
| 3,130,933 | 4/1964 | Pillsbury, Jr. et al. | 118—77X |
| 3,156,632 | 11/1964 | Chessin et al. | 118—76X |

ALFRED L. LEAVITT, Primary Examiner

C. K. WEIFFENBACH, Assistant Examiner

U.S. Cl. X.R.

117—161; 118—76, 227; 188—250